(12) United States Patent
Kilchyk et al.

(10) Patent No.: US 12,480,544 B2
(45) Date of Patent: Nov. 25, 2025

(54) HYBRID AIRFOIL AND AUXILIARY MAGNETIC BEARINGS

(71) Applicant: Hamilton Sundstrand Corporation, Charlotte, NC (US)

(72) Inventors: Viktor Kilchyk, Lancaster, NY (US); Christopher Simpson, West Hartford, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 213 days.

(21) Appl. No.: 18/331,680

(22) Filed: Jun. 8, 2023

(65) Prior Publication Data
US 2024/0410422 A1    Dec. 12, 2024

(51) Int. Cl.
*F16C 32/04* (2006.01)
*F16C 17/02* (2006.01)
*H02K 7/09* (2006.01)

(52) U.S. Cl.
CPC ........ *F16C 32/0425* (2013.01); *F16C 17/024* (2013.01); *H02K 7/09* (2013.01); *F16C 2380/26* (2013.01)

(58) Field of Classification Search
CPC .............. F16C 32/0402; F16C 17/042; F16C 32/0427; F16C 2360/44; F16C 32/0425; F16C 32/0431; F16C 39/066; F16C 27/02; F16C 27/063; F16C 17/26; F16C 35/02; F16C 17/024; F16C 17/243; F16C 2362/52; F16C 2380/26; F16C 17/20; F16C 17/107; F16C 17/246; F16C 2300/22; F16C 2326/43; F04D 29/057; F04D 29/058

USPC ......................................................... 310/90.5
See application file for complete search history.

(56) References Cited

U.S. PATENT DOCUMENTS

| | | | |
|---|---|---|---|
| 3,614,181 A | * | 10/1971 | Meeks ................ F16C 32/0425 310/90.5 |
| 4,082,376 A | | 4/1978 | Wehde et al. |
| 4,128,280 A | * | 12/1978 | Purtschert ............. F16C 39/066 310/90.5 |
| 4,444,444 A | | 4/1984 | Benedetti et al. |
| 5,345,127 A | | 9/1994 | New |
| 5,519,274 A | | 5/1996 | Scharrer |

(Continued)

FOREIGN PATENT DOCUMENTS

| | | |
|---|---|---|
| CN | 111102293 A | 5/2020 |
| CN | 115199705 A | 10/2022 |

(Continued)

OTHER PUBLICATIONS

Search Report issued in European Patent Application No. 24180736.1; Mailed Nov. 15, 2024 (11 pages).

(Continued)

*Primary Examiner* — Ahmed Elnakib
(74) *Attorney, Agent, or Firm* — CANTOR COLBURN LLP

(57) ABSTRACT

A hybrid airfoil bearing for a shaft is provided and includes airfoil bearing components and passive magnetic bearing components. The airfoil bearing components include a top foil immediately surrounding the shaft and additional components. The passive magnetic bearing components are integrated into the shaft and the additional components of the airfoil bearing components to remove a static load of the shaft on the top foil.

17 Claims, 3 Drawing Sheets

(56) References Cited

U.S. PATENT DOCUMENTS

| | | | |
|---|---|---|---|
| 5,894,181 A | 4/1999 | Imlach | |
| 6,135,640 A | 10/2000 | Nadjafi | |
| 6,353,273 B1* | 3/2002 | Heshmat | F16C 32/0444 384/103 |
| 6,877,963 B2 | 4/2005 | Beyer et al. | |
| 6,965,181 B1 | 11/2005 | Heshmat | |
| 7,836,601 B2 | 11/2010 | El-Shafei | |
| 8,113,799 B2 | 2/2012 | Wu et al. | |
| 8,531,071 B2 | 9/2013 | Klusman | |
| 8,772,992 B2 | 7/2014 | Lee et al. | |
| 9,234,522 B2 | 1/2016 | Jonsson et al. | |
| 10,385,915 B2 | 8/2019 | Himmelmann | |
| 10,634,154 B2 | 4/2020 | Morgan et al. | |
| 11,421,591 B2 | 8/2022 | Jin | |
| 11,905,993 B2 | 2/2024 | Lee et al. | |
| 2004/0042692 A1* | 3/2004 | Matsunaga | F16C 17/042 384/103 |
| 2006/0208589 A1* | 9/2006 | Foshage | F16C 32/044 310/90 |
| 2007/0069597 A1 | 3/2007 | Taniguchi et al. | |
| 2007/0164626 A1* | 7/2007 | Taniguchi | F04D 29/05 310/90.5 |
| 2009/0009017 A1* | 1/2009 | Miyagawa | F16C 32/0402 310/90.5 |
| 2010/0247010 A1* | 9/2010 | Lee | F16C 32/048 384/114 |
| 2011/0156394 A1* | 6/2011 | Klusman | F16C 32/0402 310/90.5 |
| 2013/0000328 A1* | 1/2013 | Levy | F25B 9/004 62/402 |
| 2014/0252899 A1* | 9/2014 | Looser | G01D 5/202 310/90.5 |
| 2014/0341710 A1 | 11/2014 | Creamer | |
| 2019/0003488 A1* | 1/2019 | Stefanovic | H02K 9/14 |
| 2023/0407914 A1 | 12/2023 | Lee et al. | |
| 2024/0410422 A1* | 12/2024 | Kilchyk | F16C 32/0427 |
| 2025/0043821 A1 | 2/2025 | Kilchyk et al. | |
| 2025/0084860 A1 | 3/2025 | Kilchyk et al. | |
| 2025/0084899 A1 | 3/2025 | Kilchyk et al. | |

FOREIGN PATENT DOCUMENTS

| | | |
|---|---|---|
| DE | 2702659 A1 | 7/1978 |
| EP | 687827 A1 | 12/1995 |
| JP | H0921420 A | 1/1997 |
| WO | 2016140426 A1 | 9/2016 |

OTHER PUBLICATIONS

Bekinal et al., "A hybrid (permanent magnet and foil) bearing set for complete passive levitation of high-speed rotors" Proceedings of the Institution of Mechanical Engineers, Part C: Journal of Mechanical Engineering Science 231.20 (Oct. 2017) pp. 3679-3689.

Extended European Search Report for EP Application No. 24196535.9, dated Feb. 13, 2025, pp. 1-11.

Hirani et al., "Hybrid (hydrodynamic+ permanent magnetic) journal bearings" Proceedings of the Institution of Mechanical Engineers, Part J: Journal of Engineering Tribology 221.8 (Aug. 2007): pp. 881-891.

Huang et al., "Magneto-aerostatic bearing for miniature air turbine" Mechanics & Industry 16.1 (2015): 105. pp. 1-9.

Liu et al., "Hybrid gas-magnetic bearings: An overview" International Journal of Applied Electromagnetics and Mechanics 66.2 (Jan. 2021): pp. 313-338.

Morosi et al., "Stability analysis of flexible rotors supported by hybrid permanent magnet-gas bearings" PACAM XI—11th Pan-American Congress of Applied Mechanics, Jan. 2010. pp. 1-8.

Search Report issued in European Patent Application No. 24190392.1; Date of Mailing Dec. 20, 2024 (11 pages).

Search Report issued in European Patent Application No. 24199720.4; Date of Mailing Feb. 4, 2025 (10 pages).

Slininger et al., "An overview on passive magnetic bearings" 2021 IEEE International Electric Machines & Drives Conference (IEMDC). IEEE, (May 2021) pp. 1-8.

Uzhegov et al., "Design Aspects of High-Speed Electrical Machines With Active Magnetic Bearings for Compressor Applications", IEEE Transactions on Industrial Electronics, vol. 64, No. 11, Nov. 2017, pp. 8427-8436.

Van Beneden et al., "Optimal sizing and comparison of permanent magnet thrust bearings" IEEE Transactions on Magnetics 53.2 (Feb. 2017) pp. 1-10.

* cited by examiner

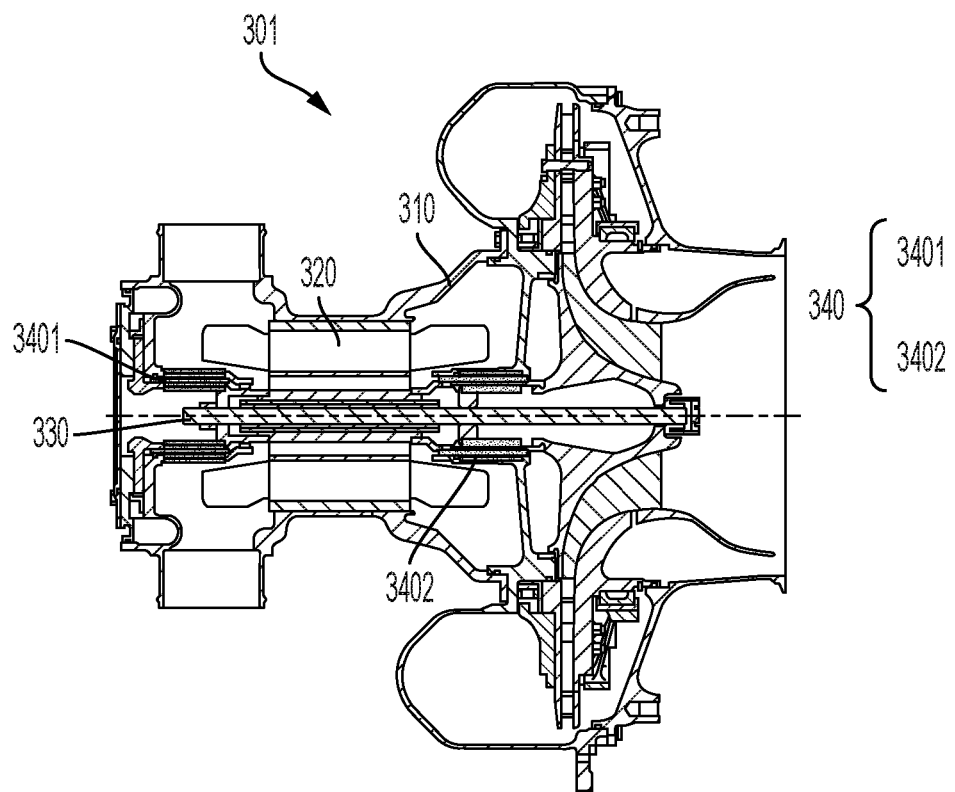
FIG. 3
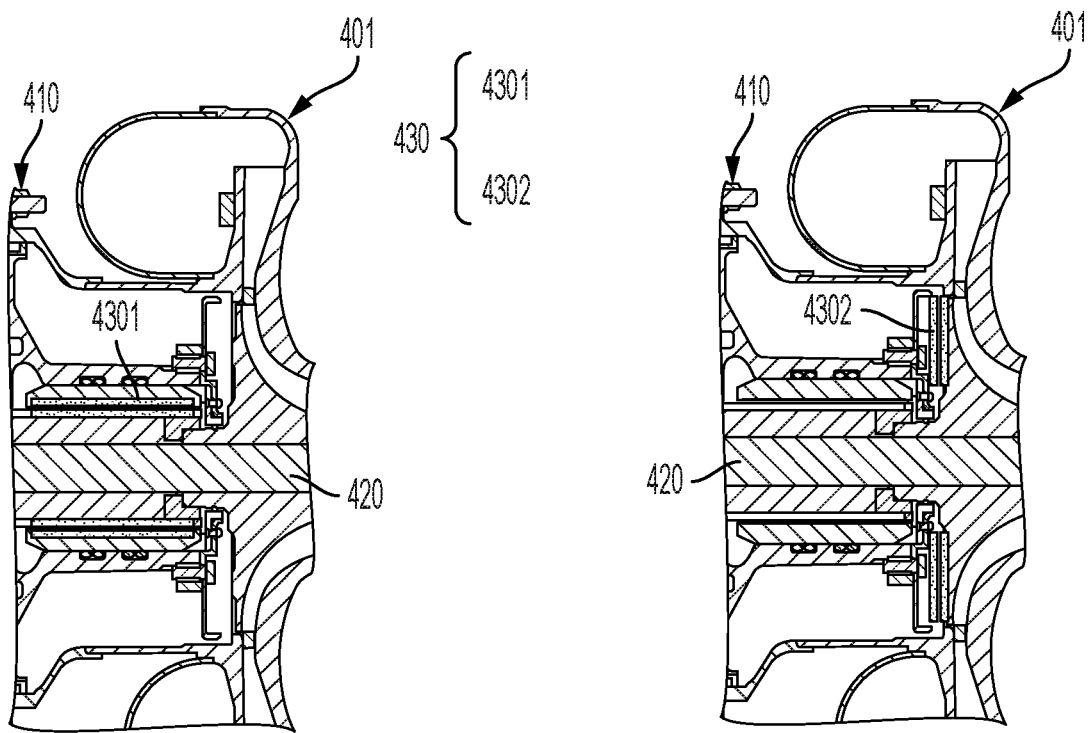
FIG. 4
FIG. 5

HYBRID AIRFOIL AND AUXILIARY MAGNETIC BEARINGS

BACKGROUND

The present disclosure relates to bearings and, in particular, to hybrid airfoil and passive magnetic bearings.

A foil bearing, also known as a foil-air bearing or airfoil bearing, is a type of air bearing. A shaft is supported by a compliant, spring-loaded foil journal lining. Once the shaft is spinning fast enough, the working fluid (usually air) pushes the foil away from the shaft so that no contact occurs. The shaft and foil are separated by high-pressure air, which is generated by the rotation that pulls gas into the bearing via viscosity effects. The high speed of the shaft with respect to the foil is required to initiate the air gap, and once this has been achieved, no wear occurs. Unlike aerostatic or hydrostatic bearings, foil bearings require no external pressurization system for the working fluid, so the hydrodynamic bearing is self-starting.

SUMMARY

According to an aspect of the disclosure, a hybrid airfoil bearing for a shaft is provided and includes airfoil bearing components and passive magnetic bearing components. The airfoil bearing components include a top foil immediately surrounding the shaft and additional components. The passive magnetic bearing components are integrated into the shaft and the additional components of the airfoil bearing components to remove a static load of the shaft on the top foil.

In accordance with additional or alternative embodiments, the additional components of the airfoil bearing components include stationary components defining a bore and the shaft is rotatable about a longitudinal axis thereof within the bore and relative to the stationary components.

In accordance with additional or alternative embodiments, the stationary components include a housing defining an outer bore and a bearing sleeve supported within the outer bore.

In accordance with additional or alternative embodiments, the stationary components further include elastomeric O-rings by which the bearing sleeve is supported within the outer bore.

In accordance with additional or alternative embodiments, the stationary components further include a bump foil surrounding the top foil.

In accordance with additional or alternative embodiments, the shaft includes first magnetic materials having a first magnetic pole at a first end thereof and second magnetic materials having a second magnetic pole, which is opposite the first magnetic pole, at a second end thereof, which is opposite the first end thereof, and at least one of the stationary components includes third magnetic materials having the first magnetic pole at a first end thereof, which corresponds to the first end of the shaft, and fourth magnetic materials having the second magnetic pole at a second end thereof, which is opposite the first end thereof and which corresponds to the second end of the shaft.

In accordance with additional or alternative embodiments, passive magnetic repulsion of the first and third magnetic materials and passive magnetic repulsion of the second and fourth magnetic materials suspends the shaft within the bore.

In accordance with additional or alternative embodiments, the at least one of the stationary components is a bearing sleeve.

In accordance with additional or alternative embodiments, the shaft includes an outer ring of magnetic materials having a first magnetic pole and at least one of the stationary components includes an inner ring of magnetic materials having the first magnetic pole.

In accordance with additional or alternative embodiments, passive magnetic repulsion of the outer and inner rings of the magnetic materials suspends the shaft within the bore.

In accordance with additional or alternative embodiments, the at least one of the stationary components is a bearing sleeve.

According to an aspect of the disclosure, a hybrid airfoil bearing is provided and includes a housing defining an outer bore, a bearing sleeve supportively disposed within the outer bore and defining an inner bore, a shaft, which is rotatable about a longitudinal axis thereof within the inner bore and relative to the housing and the bearing sleeve and a top foil immediately surrounding the shaft. The bearing sleeve and the shaft are configured for passive magnetic repulsion of one another to suspend the shaft within the inner bore and to remove a static load of the shaft on the top foil.

In accordance with additional or alternative embodiments, the shaft includes first magnetic materials having a first magnetic pole at a first end thereof and second magnetic materials having a second magnetic pole, which is opposite the first magnetic pole, at a second end thereof, which is opposite the first end thereof, and the bearing sleeve includes third magnetic materials having the first magnetic pole at a first end thereof, which corresponds to the first end of the shaft, and fourth magnetic materials having the second magnetic pole at a second end thereof, which is opposite the first end thereof and which corresponds to the second end of the shaft.

In accordance with additional or alternative embodiments, the shaft includes an outer ring of magnetic materials having a first magnetic pole and the bearing sleeve includes an inner ring of magnetic materials having the first magnetic pole.

According to an aspect of the disclosure, a device is provided and includes a housing, a rotor, which is rotatable within the housing, and one or more hybrid airfoil bearings to support the rotor within the housing. Each of the one or more hybrid airfoil bearings includes airfoil bearing components and passive magnetic bearing components. The airfoil bearing components include a top foil immediately surrounding the shaft and additional components. The passive magnetic bearing components are integrated into the shaft and the additional components of the airfoil bearing components to remove a static load of the shaft on the top foil.

In accordance with additional or alternative embodiments, the device is an aviation motor of an aircraft, the device further includes a stator configured to generate magnetic flux to drive rotation of the rotor and the one or more hybrid airfoil bearings include first and second hybrid airfoil bearings on either side of the stator.

In accordance with additional or alternative embodiments, the device is an air cycle machine and the one or more hybrid airfoil bearings include at least one of an axially oriented hybrid airfoil bearing and a radially oriented hybrid airfoil bearing.

In accordance with additional or alternative embodiments, the additional components of the airfoil bearing components include stationary components defining a bore and a shaft of the rotor is rotatable about a longitudinal axis thereof within the bore and relative to the stationary components.

In accordance with additional or alternative embodiments, the shaft includes first magnetic materials having a first magnetic pole at a first end thereof and second magnetic materials having a second magnetic pole, which is opposite the first magnetic pole, at a second end thereof, which is opposite the first end thereof, and at least one of the stationary components includes third magnetic materials having the first magnetic pole at a first end thereof, which corresponds to the first end of the shaft, and fourth magnetic materials having the second magnetic pole at a second end thereof, which is opposite the first end thereof and which corresponds to the second end of the shaft.

In accordance with additional or alternative embodiments, the shaft includes an outer ring of magnetic materials having a first magnetic pole and at least one of the stationary components includes an inner ring of magnetic materials having the first magnetic pole.

Additional features and advantages are realized through the techniques of the present disclosure. Other embodiments and aspects of the disclosure are described in detail herein and are considered a part of the claimed technical concept. For a better understanding of the disclosure with the advantages and the features, refer to the description and to the drawings.

BRIEF DESCRIPTION OF THE DRAWINGS

For a more complete understanding of this disclosure, reference is now made to the following brief description, taken in connection with the accompanying drawings and detailed description, wherein like reference numerals represent like parts:

FIG. 3 is a side view of an aviation motor including hybrid airfoil bearings in accordance with embodiments;

FIG. 4 is a side view of an air cycle machine (ACM) including axially arranged hybrid airfoil bearings in accordance with embodiments; and FIG. 5 is a side view of an air cycle machine (ACM) including radially arranged hybrid airfoil bearings in accordance with embodiments.

DETAILED DESCRIPTION

Airfoil bearings have certain limitations. These include a minimum speed to activate, sensitivity to damage due to metal-to-metal contact and/or inadequate thermal management. Active magnetic bearings resolve many of these issues, but have added cost and weight as well as a need for circuitry to provide current for the electromagnet.

Thus, as will be described below, a new type of hybrid airfoil bearing is provided. The hybrid airfoil bearing includes airfoil bearing components and permanent (or passive) magnetic bearing components. The magnetic bearing component use non-controllable repulsion force to improve bearing capacity and reliability. The magnetized components can be incorporated into airfoil components, such as a sleeve and a shaft.

Figure 1A:
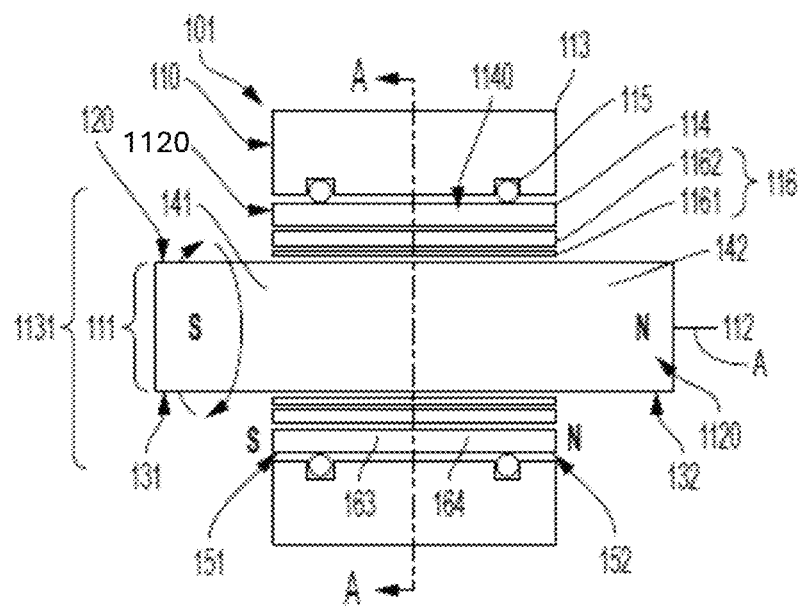
FIG. 1A is a schematic side view of a hybrid airfoil bearing with axial segmentation in accordance with embodiments.
Figure 1B:
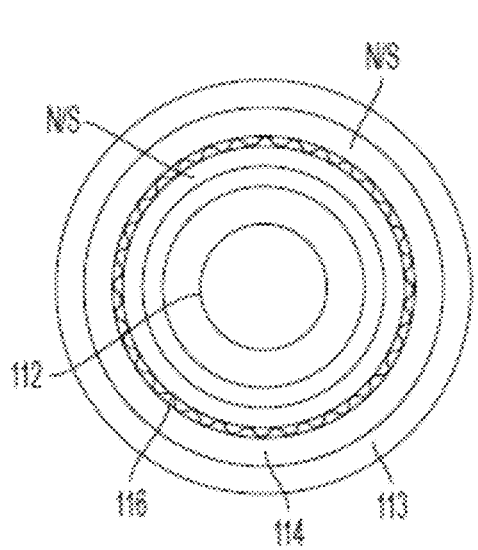
FIG. 1B is a cross-sectional view of the hybrid airfoil bearing with the axial segmentation taken along line A-A of FIG. 1A in accordance with embodiments.
Figure 1C:
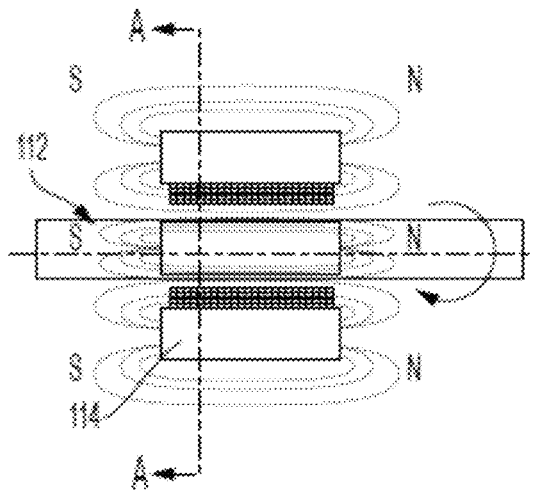
FIG. 1C is an illustration of magnetic flux lines of the hybrid airfoil bearing with the axial segmentation of FIG. 1A in accordance with embodiments.

With reference to FIGS. 1A, 1B and 1C, a hybrid airfoil bearing 101 is provided for use with a shaft 112. The hybrid airfoil bearing 101 includes airfoil bearing components 110 and passive magnetic bearing components 120 that are integrated into the shaft 112 and the airfoil bearing components 110. The passive magnetic bearing components 120 can include or be provided with magnetic material that tends to retain its magnetic characteristics during high-temperature and high-pressure operations associated with aviation motors of an aircraft and air cycle machines (ACMs). that are integrated into the shaft 112 and the airfoil bearing components 110. The airfoil bearing components 110 include a top foil 1161 (see below) that immediately surrounds the shaft 112 and stationary components that define an inner bore 111. The shaft 112 is rotatable about a longitudinal axis A thereof within the inner bore 111 and relative to the stationary components. The stationary components include a housing 113, such as a motor housing, that defines an outer bore 1131 and a bearing sleeve 114 that is supported within the outer bore 1131. The stationary components further include elastomeric O-rings 115, by which the bearing sleeve 114 is supported within the outer bore 1131, and one or more foils 116 for supporting the shaft 112. The one or more foils 116 include the top foil 1161 and a corrugated bump foil 1162 surrounding the top foil 1161. With the top foil 1161 immediately surrounding the shaft 112, the bump foil 1162 immediately surrounds the top foil 1161. The one or more foils 116 can each include or be provided with high magnetic permeability materials. Additionally or alternatively, the one or more foils 116 can each be provided as a mesh.

The stationary components can also include one more filters that prevent particles, such as magnetic particles, from becoming trapped in the hybrid airfoil bearing 101.

During operation of the airfoil bearing components, if not for the presence of the passive magnetic bearing components 120, the shaft 112 would be supported as a static load by the one or more foils 116 (i.e., the top foil 1161) until the shaft 112 begins spinning or rotating fast enough for working fluid (i.e., air) to push the shaft 112 away from the one or more foils 116 so that no contact occurs. The initial contact between the shaft 112 and the one or more foils 116 (i.e., the static load of the shaft 112 on the top foil 1161) as well as the possibility of a loss of pressure of the working fluid during high-speed rotation of the shaft 112 can lead to wear and damage of the airfoil bearing components 110.

The passive magnetic bearing components 120 serve as auxiliary magnetic bearings to remove the static load of the shaft 112 on the top foil 1161 and to provide for auxiliary rotor or shaft support and emergency operation backup. For example, in case of a temporary loss of capacity due to low-speed rotation, rotor imbalance (surging), etc., the passive magnetic bearing components 120 would eliminate or reduce the chances of unit damage due to failure of the airfoil bearing components 110 maintaining separation of the shaft 112 and at least the top foil 1161 of the one or more foils 116. The passive magnetic bearing components 120 generate a repulsion force between the shaft 112 and at least the top foil 1161 of the one or more foils 116. This repulsion force is proportional to an inverse of a distance between the respective bearing surfaces of the shaft 112 and at least the top foil 1161 of the one or more foils 116 and becomes significant when the shaft 112 deviates from its centered (axial and/or radial) location.

In addition, since the passive magnetic bearing components 120 are integrated into the shaft 112 and the airfoil bearing components 110, the hybrid airfoil bearing 101 can be manufactured easily and without extensive additional costs.

With continued reference to FIGS. 1A, 1B and 1C, the shaft 112 can be provided as an elongate dipole magnet 1120 with a first end 131 and a second end 132 that is opposite the first end 131. At the first end 131, the shaft 112 includes first magnetic materials 141 having a first magnetic pole. At the second end 132, the shaft 112 includes second magnetic materials 142 having a second magnetic pole, which is opposite the first magnetic pole. At least one of the stationary components, such as the bearing sleeve 114 (for purposes of clarity and brevity, the following description will relate to the case in which the at least one of the stationary components is the bearing sleeve 114), can be provided as an elongate dipole magnet 1140 that surrounds the shaft 112 with a first end 151 corresponding to the first end 131 and a second end 152, which is opposite the first end 151 and corresponds to the second end 132. At the first end 151, the bearing sleeve 114 includes third magnetic materials 163 having the first magnetic pole. At the second end 152, the bearing sleeve 114 includes fourth magnetic materials 164 having the second magnetic pole. With this configuration, passive magnetic repulsion of the first magnetic materials 141 and the third magnetic materials 163 and passive magnetic repulsion of the second magnetic materials 142 and the fourth magnetic materials 164 suspends the shaft 112 within the inner bore 111 and maintains separation between the shaft 112 and both the bearing sleeve 114 and the one or more foils 116.

With the shaft 112 being provided as the elongate dipole magnet 1120, the description provided herein is distinguished from conventional cases in which an elongate dipole magnet is attached to or about a shaft. That is, in those conventional cases, passive magnetic components are not integrated into a shaft whereas in the description provided herein the passive magnet components 120 are integrated into the shaft 112 to form the shaft 112 into the elongate dipole magnet 1120.

It is to be understood that additional magnetic materials can be added to an exterior of the shaft 112, but not to the exclusion of passive magnetic materials being integrated into the shaft 112 as described above. It is to be further understood that the passive magnetic materials integrated into the shaft 112 and the bearing sleeve 114 need not be uniformly distributed throughout the shaft 112 or the bearing sleeve 114, particularly in the circumferential dimension. For example, the passive magnetic materials in the shaft 112 and the bearing sleeve 114 can be segmented along an entirety of the circumferential dimension of the shaft 112 and the bearing sleeve 114 and/or localized at one or more circumferential sections of the shaft 112 and the bearing sleeve 114 so that when the shaft 112 comes to rest, the one or more circumferential sections of the shaft 112 and the bearing sleeve 114 align in the vertical direction and remove the load of the shaft 112 on the one or more foils 116 in opposition to the force of gravity.

Figure 2A:
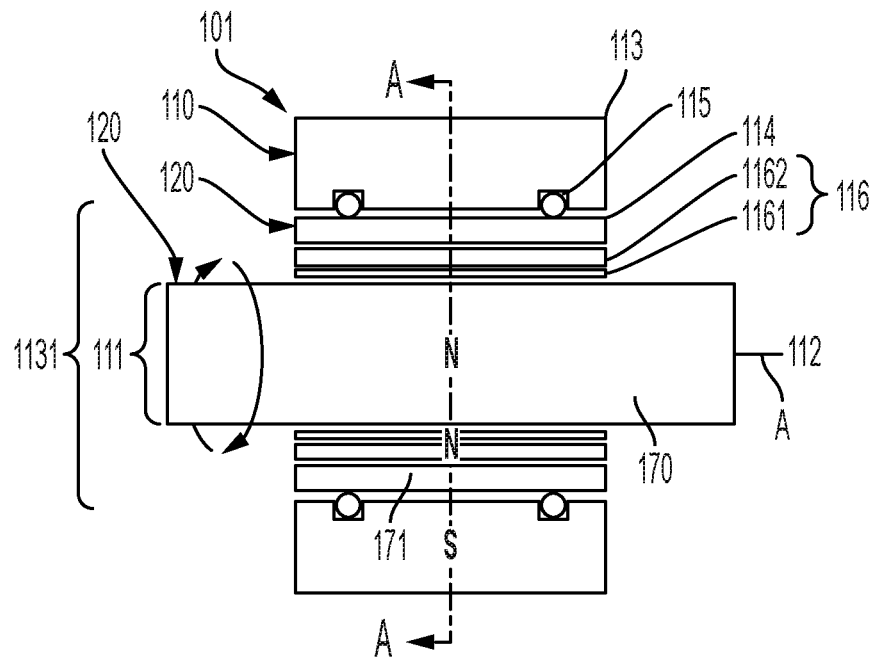
FIG. 2A is a schematic side view of a hybrid airfoil bearing with a radial configuration in accordance with embodiments.
Figure 2B:
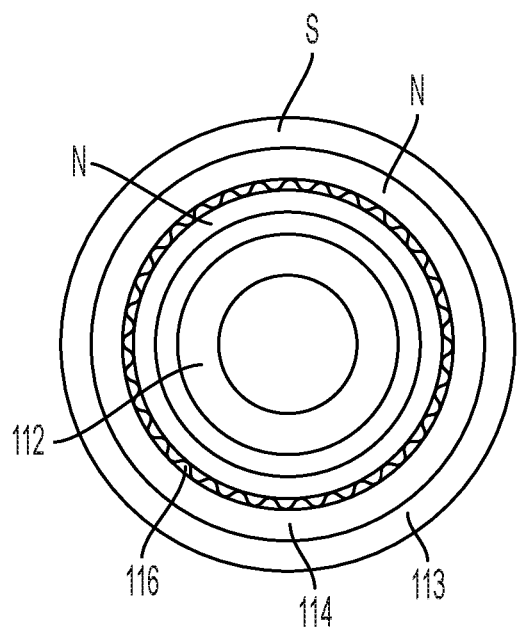
FIG. 2B is a cross-sectional view of the hybrid airfoil bearing with the radial configuration taken along line A-A of FIG. 2A in accordance with embodiments.

With reference to FIGS. 2A and 2B, the hybrid airfoil bearing 101 is provided with a similar overall configuration as the configuration described above but with a different passive magnetic arrangement. The following description will thus omit the details of the hybrid airfoil bearing 101 of FIGS. 2A and 2B that are already described above.

In FIGS. 2A and 2B, the shaft 112 includes an outer ring of magnetic materials 170 integrated therein and having a first magnetic pole and optionally an inner core of magnetic materials having a second magnetic pole and the bearing sleeve 114 includes an inner ring of magnetic materials 171 having the first magnetic pole and an outer ring of magnetic materials having the second magnetic pole. In this case, passive magnetic repulsion of the outer ring of magnetic materials 171 and the inner ring of magnetic materials 170 suspends the shaft 112 within the inner bore 111 and maintains separation between the shaft 112 and both the bearing sleeve 114 and the one or more foils 116. The shaft 112 can further include a hollow interior within the outer ring of magnetic materials 170 or an inner ring of magnetic materials that is either of a same pole as the outer ring of magnetic materials 170 or an opposite pole as the outer ring of magnetic materials 170. In any case, the shaft 112 does not include any portion formed of non-magnetic materials.

It is to be understood that additional magnetic materials can be added to an exterior of the shaft 112, but not to the exclusion of passive magnetic materials being integrated into the shaft 112 as described above. It is to be further understood that the passive magnetic materials integrated into the shaft 112 and the bearing sleeve 114 need not be uniformly distributed throughout the shaft 112 or the bearing sleeve 114, particularly in the circumferential dimension. For example, the passive magnetic materials in the shaft 112 and the bearing sleeve 114 can be segmented along an entirety of the circumferential dimension of the shaft 112 and the bearing sleeve 114 and/or localized at one or more circumferential sections of the shaft 112 and the bearing sleeve 114 so that when the shaft 112 comes to rest, the one or more circumferential sections of the shaft 112 and the bearing sleeve 114 align in the vertical direction and remove the load of the shaft 112 on the one or more foils 116 in opposition to the force of gravity.

As above, with the shaft 112 including the outer ring of magnetic materials 170 integrated therein, the description provided herein is distinguished from conventional cases in which a ring of passive magnetic materials is attached to or about a shaft of non-magnetic materials. That is, in those conventional cases, passive magnetic components are not integrated into a shaft whereas in the description provided herein the outer ring of magnetic materials 170 are integrated into the shaft 112.

Thus, in general, the shaft 112 and both the bearing sleeve 114 and the one or more foils 116 are respectively configured for passive magnetic repulsion of one another to suspend the shaft 112 within the inner bore 111 and to act as an auxiliary bearing for the airfoil bearing components 110.

It is to be understood that the magnetic materials of the embodiments of FIGS. 1A, 1B and 1C and the magnetic materials of the embodiments of FIGS. 2A and 2B may exhibit variable magnetization in circumferential, axial and/or radial dimensions to accommodate and/or account for possible variable attitude angles of the hybrid airfoil bearing 101.

With reference to FIG. 3, a device 301 is provided as an aviation motor of an aircraft and includes a housing 310, a stator 320, a rotor 330 that is rotatable within the housing 310 and one or more hybrid airfoil bearings 340. The stator 320 is configured to generate magnetic flux to drive rotation of the rotor 330. The one or more hybrid airfoil bearings 340 can be provided as first and second hybrid airfoil bearings 3401 and 3402. Each of the first and second hybrid airfoil bearings 3401 and 3402 is configured as described above with reference to FIGS. 1A, 1B and 1C or FIGS. 2A and 2B.

With reference to FIGS. 4 and 5, a device 401 is provided as an ACM and includes a housing 410, a rotor 420 that is rotatable within the housing 410 and one or more hybrid airfoil bearings 430. The one or more hybrid airfoil bearings 430 can be provided as an axially oriented hybrid airfoil bearing 4301 (see FIG. 4) and a radially oriented hybrid airfoil bearing 4302 (see FIG. 5). Each of the axially oriented hybrid airfoil bearing 4301 and the radially oriented hybrid airfoil bearing 4302 is configured as described above with reference to FIGS. 1A, 1B and 1C or FIGS. 2A and 2B. In each case of the hybrid airfoil bearings 430 being used with an ACM, the various sleeves described above can be integrated into the ACM.

Technical effects and benefits of the present disclosure are the provision of a hybrid airfoil bearing that offers improved operation below a critical speed, increased bearing capacity, reduced or eliminated metal-to-metal contact in case of bearing overloading (e.g., due to rotor icing), increased bearing and machine (e.g., aviation motor, air cycle machine (ACM), etc.) durability and lifetime and a minimum impact on weight and costs of the machine.

The corresponding structures, materials, acts and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the technical concepts in the form disclosed. Many modifications and variations will be apparent to those of ordinary skill in the art without departing from the scope and spirit of the disclosure. The embodiments were chosen and described in order to best explain the principles of the disclosure and the practical application and to enable others of ordinary skill in the art to understand the disclosure for various embodiments with various modifications as are suited to the particular use contemplated.

While the preferred embodiments to the disclosure have been described, it will be understood that those skilled in the art, both now and in the future, may make various improvements and enhancements which fall within the scope of the claims which follow. These claims should be construed to maintain the proper protection for the disclosure first described.

What is claimed is:

1. A hybrid airfoil bearing for a shaft, the airfoil bearing comprising:
   airfoil bearing components comprising a top foil immediately surrounding the shaft, the airfoil bearing components further comprising additional components; and
   passive magnetic bearing components integrated into the shaft and the additional components of the airfoil bearing components to remove a static load of the shaft on the top foil,
   wherein:
   the additional components of the airfoil bearing components comprise stationary components defining a bore and the shaft is rotatable about a longitudinal axis thereof within the bore and relative to the stationary components, and
   the stationary components comprise a housing defining an outer bore, a bearing sleeve supported within the outer bore and a singular bump foil completely surrounding the top foil in a circumferential direction.

2. The hybrid airfoil bearing according to claim 1, wherein:
   the shaft comprises first magnetic materials having a first magnetic pole at a first end thereof and second magnetic materials having a second magnetic pole, which is opposite the first magnetic pole, at a second end thereof, which is opposite the first end thereof, and
   at least one of the stationary components comprises third magnetic materials having the first magnetic pole at a first end thereof, which corresponds to the first end of the shaft, and fourth magnetic materials having the second magnetic pole at a second end thereof, which is opposite the first end thereof and which corresponds to the second end of the shaft.

3. The hybrid airfoil bearing according to claim 2, wherein passive magnetic repulsion of the first and third magnetic materials and passive magnetic repulsion of the second and fourth magnetic materials suspends the shaft within the bore.

4. The hybrid airfoil bearing according to claim 2, wherein the at least one of the stationary components is a bearing sleeve.

5. The hybrid airfoil bearing according to claim 1, wherein:
   the shaft comprises an outer ring of magnetic materials having a first magnetic pole, and
   at least one of the stationary components comprises an inner ring of magnetic materials having the first magnetic pole.

6. The hybrid airfoil bearing according to claim 5, wherein passive magnetic repulsion of the outer and inner rings of the magnetic materials suspends the shaft within the bore.

7. The hybrid airfoil bearing according to claim 5, wherein the at least one of the stationary components is a bearing sleeve.

8. A hybrid airfoil bearing for a shaft, the airfoil bearing comprising:
   airfoil bearing components comprising a top foil immediately surrounding the shaft, the airfoil bearing components further comprising additional components; and
   passive magnetic bearing components integrated into the shaft and the additional components of the airfoil bearing components to remove a static load of the shaft on the top foil,
   wherein:
   the additional components of the airfoil bearing components comprise stationary components defining a bore and the shaft is rotatable about a longitudinal axis thereof within the bore and relative to the stationary components, and
   the stationary components comprise a housing defining an outer bore, a bearing sleeve supported within the outer bore and elastomeric O-rings by which the bearing sleeve is supported within the outer bore.

9. A hybrid airfoil bearing, comprising:
   a housing defining an outer bore;
   a bearing sleeve supportively disposed within the outer bore and defining an inner bore;
   a shaft, which is rotatable about a longitudinal axis thereof within the inner bore and relative to the housing and the bearing sleeve;
   a top foil immediately surrounding the shaft; and
   a singular bump foil completely surrounding the top foil in a circumferential direction,
   the bearing sleeve and the shaft being configured for passive magnetic repulsion of one another to suspend the shaft within the inner bore and to remove a static load of the shaft on the top foil.

10. The hybrid airfoil bearing according to claim 9, wherein:
the shaft comprises first magnetic materials having a first magnetic pole at a first end thereof and second magnetic materials having a second magnetic pole, which is opposite the first magnetic pole, at a second end thereof, which is opposite the first end thereof, and
the bearing sleeve comprises third magnetic materials having the first magnetic pole at a first end thereof, which corresponds to the first end of the shaft, and fourth magnetic materials having the second magnetic pole at a second end thereof, which is opposite the first end thereof and which corresponds to the second end of the shaft.

11. The hybrid airfoil bearing according to claim 9, wherein:
the shaft comprises an outer ring of magnetic materials having a first magnetic pole, and
the bearing sleeve comprises an inner ring of magnetic materials having the first magnetic pole.

12. A device, comprising:
a housing;
shaft, which is rotatable within the housing; and
hybrid airfoil bearings to support the shaft within the housing,
each of the hybrid airfoil bearings comprising:
airfoil bearing components comprising a top foil immediately surrounding the shaft, the airfoil bearing components further comprising additional components; and
passive magnetic bearing components integrated into the shaft and the additional components of the airfoil bearing components to remove a static load of the shaft on the top foil,
wherein:
the additional components of the airfoil bearing components comprise stationary components defining a bore and the shaft is rotatable about a longitudinal axis thereof within the bore and relative to the stationary components, and
the stationary components comprise a housing defining an outer bore, a bearing sleeve supported within the outer bore and a singular bump foil completely surrounding the top foil in a circumferential direction.

13. The device according to claim 12, wherein:
the device is an aviation motor of an aircraft,
the device further comprises a stator configured to generate magnetic flux to drive rotation of the shaft, and
the hybrid airfoil bearings comprise first and second hybrid airfoil bearings on either side of the stator.

14. The device according to claim 12, wherein:
the device is an air cycle machine, and
the hybrid airfoil bearings comprise at least one of an axially oriented hybrid airfoil bearing and a radially oriented hybrid airfoil bearing.

15. The motor according to claim 12, wherein:
the additional components of the airfoil bearing components comprise stationary components defining a bore, and
the shaft is rotatable about a longitudinal axis thereof within the bore and relative to the stationary components.

16. The motor according to claim 15, wherein:
the shaft comprises first magnetic materials having a first magnetic pole at a first end thereof and second magnetic materials having a second magnetic pole, which is opposite the first magnetic pole, at a second end thereof, which is opposite the first end thereof, and
at least one of the stationary components comprises third magnetic materials having the first magnetic pole at a first end thereof, which corresponds to the first end of the shaft, and fourth magnetic materials having the second magnetic pole at a second end thereof, which is opposite the first end thereof and which corresponds to the second end of the shaft.

17. The motor according to claim 15, wherein:
the shaft comprises an outer ring of magnetic materials having a first magnetic pole, and
at least one of the stationary components comprises an inner ring of magnetic materials having the first magnetic pole.

* * * * *